(12) United States Patent
Mori et al.

(10) Patent No.: US 12,090,575 B2
(45) Date of Patent: Sep. 17, 2024

(54) LASER PROCESSING APPARATUS AND LASER PROCESSING METHOD

(71) Applicant: DISCO CORPORATION, Tokyo (JP)

(72) Inventors: Kazuki Mori, Tokyo (JP); Kazuya Hirata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 385 days.

(21) Appl. No.: 17/649,846

(22) Filed: Feb. 3, 2022

(65) Prior Publication Data
US 2022/0266393 A1 Aug. 25, 2022

(30) Foreign Application Priority Data

Feb. 19, 2021 (JP) ................... 2021-025027

(51) Int. Cl.
| | |
|---|---|
| *B23K 26/38* | (2014.01) |
| *B23K 26/70* | (2014.01) |
| *G01N 21/64* | (2006.01) |
| *B23K 101/36* | (2006.01) |

(52) U.S. Cl.
CPC ............ *B23K 26/38* (2013.01); *B23K 26/702* (2015.10); *G01N 21/643* (2013.01); *B23K 2101/36* (2018.08)

(58) Field of Classification Search
CPC .. B23K 26/38; B23K 26/702; B23K 2101/36; B23K 2101/40; B23K 2103/52; B23K 26/03; B23K 26/0622; B23K 26/0853; B23K 26/53; B23K 26/0823; B23K 26/402; B23K 26/0006; B23K 26/0648; B23K 26/0869; G01N 21/643; G01N 21/64

See application file for complete search history.

(56) References Cited

U.S. PATENT DOCUMENTS

2020/0150038 A1* 5/2020 Ito ..................... G01N 21/6489

FOREIGN PATENT DOCUMENTS

| JP | 2016111143 A | 6/2016 |
|---|---|---|
| JP | 2020077783 A | 5/2020 |

* cited by examiner

*Primary Examiner* — Courtney D Thomas
(74) *Attorney, Agent, or Firm* — Greer Burns & Crain Ltd.

(57) ABSTRACT

Irradiation conditions for a laser beam to respective ones of a plurality of regions included in the upper surface of an ingot are set according to the numbers of photons of fluorescence occurring when excitation light is irradiated to the respective regions. Here, it is to be understood that the number of the photons of the fluorescence occurring from a region of an ingot depends on the concentration of an impurity doped in the ingot. A separation layer can therefore be formed at a uniform depth from the upper surface of the ingot even if regions of different impurity concentrations are included in the ingot. It is hence possible to reduce a kerf loss when wafers are sliced from an ingot.

8 Claims, 11 Drawing Sheets

LASER PROCESSING APPARATUS AND LASER PROCESSING METHOD

BACKGROUND OF THE INVENTION

Field of the Invention

The present invention relates to a laser processing apparatus and laser processing method for forming a separation layer in an ingot to slice a wafer.

Description of the Related Art

Chips of semiconductor devices are generally manufactured using disc-shaped wafers. Such wafers are sliced and formed from a cylindrical ingot, for example, using a wire saw. If wafers are formed in this manner, however, a majority of the ingot is wasted as a kerf loss (cutting allowance), leading to a problem that this slicing method is not economical.

Moreover, silicon carbide (SiC) single crystal employed as a material for power devices has high hardness. Accordingly, slicing takes time and results in poor productivity if wafers are sliced from a SiC single crystal ingot using a wire saw.

With these problems in view, a method has been proposed to slice wafers from an ingot using a laser beam without employing a wire saw (see, for example, JP 2016-111143A). In this method, a laser beam of a wavelength, which has transmissivity through an ingot, is irradiated to the ingot such that a focal point of the laser beam is positioned inside the ingot.

As a consequence, a separation layer, which includes modified layers and cracks extending from the modified layers, is formed inside the ingot. When an external force such as ultrasonic vibrations is applied to the ingot with the separation layer formed therein, the ingot separates at the separation layer so that a wafer is sliced.

Here, it should be understood that an impurity such as nitrogen is generally doped in a SiC single crystal ingot to impart electrical conductivity. However, the SiC single crystal ingot is not uniformly doped with such an impurity and may include a plurality of regions of different impurity concentrations.

For example, a region which is called a "facet region" and is flat at the atomic level is formed in the process of growth of a SiC single crystal, and has a higher impurity concentration than the remaining region (non-facet region). Further, a region having a high impurity concentration like the facet region is high in refractive index and also high in energy absorption rate compared with the non-facet region.

If a separation layer is formed by the above-mentioned method in a SiC single crystal ingot including a facet region, there is hence a problem that the separation layer is not formed at a uniform position (height) and a large kerf loss arises.

With the foregoing problem in view, a laser processing apparatus has been proposed to specify a facet region and a non-facet region in a SiC ingot and to irradiate a laser beam to both the regions under different irradiation conditions (see, for example, JP 2020-77783 A).

SUMMARY OF THE INVENTION

The impurity concentration in the facet region may not be uniform, and may be different between its central part and its outer peripheral part. In such a case, there is a potential problem that variations may occur in the position (height), at which a separation layer is formed in the facet region, even if a laser beam is irradiated to the facet region under irradiation conditions different from those for the non-facet region.

In addition, regions of different impurity concentrations may also be included in the non-facet region. There is hence a potential problem that the kerf loss cannot be sufficiently reduced even if the laser beam is irradiated to the facet region and the non-facet region under different irradiation conditions.

With the foregoing potential problems in view, the present invention has as objects thereof the provision of a laser processing apparatus and a laser processing method, which can reduce the kerf loss when wafers are sliced from an ingot.

The present inventors found that the higher the concentration of an impurity doped in an ingot, the smaller the number of photons of fluorescence to be caused by irradiation of excitation light to the ingot, leading to the completion of the present invention.

In accordance with a first aspect of the present invention, there is provided a laser processing apparatus for forming a separation layer in an ingot to slice a wafer. The laser processing apparatus includes a holding unit having a holding surface to hold the ingot, a fluorescence detection unit configured to irradiate excitation light of a predetermined wavelength to the ingot from above the ingot, and to detect fluorescence occurring from the ingot, a laser beam irradiation unit configured to irradiate a laser beam of a wavelength, which has transmissivity through the ingot, to the ingot with a focal point of the laser beam positioned at a depth from an upper surface of the ingot, the depth corresponding to a thickness of the wafer to be sliced from the ingot, so that the separation layer is formed in the ingot, a horizontal moving mechanism that relatively moves the holding unit and the laser beam irradiation unit in a direction parallel to the holding surface, and a control unit. The control unit has a storage section configured to store respective ones of a plurality of coordinate points, which indicate a plurality of regions included on the upper surface of the ingot, on a coordinate plane parallel to the holding surface, and the numbers of photons of fluorescence, which are detected by the fluorescence detection unit when the excitation light is irradiated to respective ones of the plurality of regions, in association with each other, and an irradiation condition setting section configured to set irradiation conditions for the laser beam to the respective ones of the plurality of regions, which are indicated by the plurality of coordinate points, according to the numbers of the photons of the fluorescence stored in association with the respective ones of the plurality of coordinate points.

In the laser processing apparatus according to the present invention, the storage section may preferably be configured to store beforehand irradiation conditions for the laser beam, which are to be set for the respective ones of the plurality of regions indicated by the plurality of coordinate points, according to the numbers of the photons of the fluorescence detected by the fluorescence detection unit, and the irradiation condition setting section may preferably be configured to set irradiation conditions for the laser beam to the respective ones of the plurality of regions, which are indicated by the plurality of coordinate points, with reference to the irradiation conditions for the laser beam, which correspond to the numbers of the photons of the fluorescence and are stored in the storage section.

In the laser processing apparatus according to the present invention, the irradiation condition setting section may preferably be configured to set the irradiation conditions for the laser beam such that at least one of an output power of the laser beam, a height of a condenser lens that condenses the laser beam, and an overlap rate of the laser beam is changed according to the numbers of the photons of the fluorescence, which are stored in association with the respective ones of the plurality of coordinate points.

In accordance with a second aspect of the present invention, there is provided a laser processing method for forming a separation layer in an ingot to slice a wafer. The laser processing method includes a holding step of holding the ingot thereon, a fluorescence detection step, after the holding step, of irradiating excitation light of a predetermined wavelength to the ingot from above the ingot and detecting fluorescence occurring from the ingot, a storage step of storing respective ones of a plurality of coordinate points, which indicate a plurality of regions included on an upper surface of the ingot, and the numbers of photons of fluorescence, which are detected when the excitation light of the predetermined wavelength is irradiated to the respective ones of the plurality of regions in the fluorescence detection step, in association with each other, and a laser beam irradiation step of irradiating a laser beam of a wavelength, which has transmissivity through the ingot, to the ingot with a focal point of the laser beam positioned at a depth from an upper surface of the ingot, the depth corresponding to a thickness of the wafer to be sliced from the ingot, and relatively moving the focal point and the ingot, so that the separation layer is formed in the ingot. In the laser beam irradiation step, the separation layer is formed in the ingot while irradiation conditions for the laser beam are being changed to the respective ones of the plurality of regions, which are indicated by the plurality of coordinate points, according to the numbers of the photons of the fluorescence stored in association with the respective ones of the plurality of coordinate points in the storage step.

Preferably, the laser processing method according to the present invention may further includes an irradiation condition storage step of storing beforehand irradiation conditions for the laser beam, which are to be set for the respective ones of the plurality of regions indicated by the plurality of coordinate points, according to the numbers of the photons of the fluorescence occurring from the ingot by irradiating the excitation light of the predetermined wavelength to the ingot. In the laser beam irradiation step, the irradiation condition for the laser beam to the respective ones of the plurality of regions, which are indicated by the plurality of coordinate points, may preferably be set with reference to the irradiation conditions for the laser beam, which correspond to the numbers of the photons of the fluorescence as stored in the irradiation condition storage step.

In the laser processing method according to the second aspect of the present invention, as the irradiation conditions for the laser beam, at least one of an output power of the laser beam, a height of a condenser lens that condenses the laser beam, and an overlap rate of the laser beam may preferably be set according to the numbers of the photons of the fluorescence, which are stored in association with the respective ones of the plurality of coordinate points.

In the present invention, the irradiation conditions for the laser beam to the respective ones of the plurality of regions (hereinafter simply called "the respective regions" for the sake of simplicity) included in the upper surface of the ingot are set according to the numbers of the photons of the fluorescence occurring when the excitation light is irradiated to the respective regions. Here, it is to be understood that the number of photons of fluorescence occurring from a region of an ingot depends on the concentration of an impurity doped in the ingot.

In the present invention, the separation layer can therefore be formed at a uniform depth from the upper surface of the ingot even if regions of different impurity concentrations are included in the ingot. It is hence possible to reduce the kerf loss when wafers are sliced from the ingot.

The above and other objects, features and advantages of the present invention and the manner of realizing them will become more apparent, and the invention itself will best be understood from a study of the following description and appended claims with reference to the attached drawings illustrating a preferred embodiment of the invention.

DETAILED DESCRIPTION OF THE PREFERRED EMBODIMENT

Figure 1A:
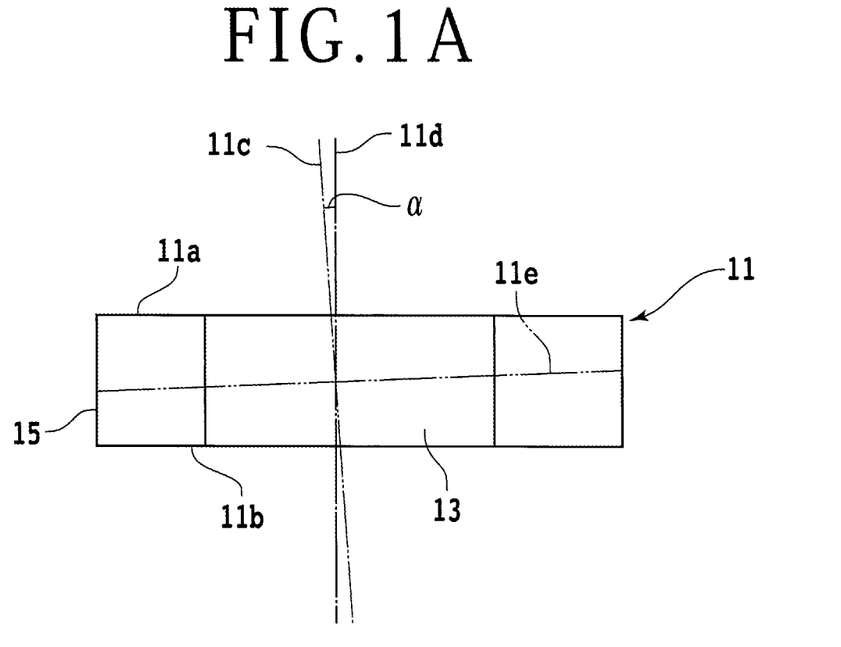
FIG. 1A is a front view schematically illustrating an example of an ingot.

With reference to the attached drawings, a description will be made about an embodiment of a first aspect and an embodiment of a second aspect of the present invention, and a modification of the embodiment of the second aspect. FIG. 1A is a front view schematically illustrating an example of an ingot from which wafer is sliced using a laser processing apparatus, and FIG. 1B is a top plan view of the ingot.

Figure 1B:
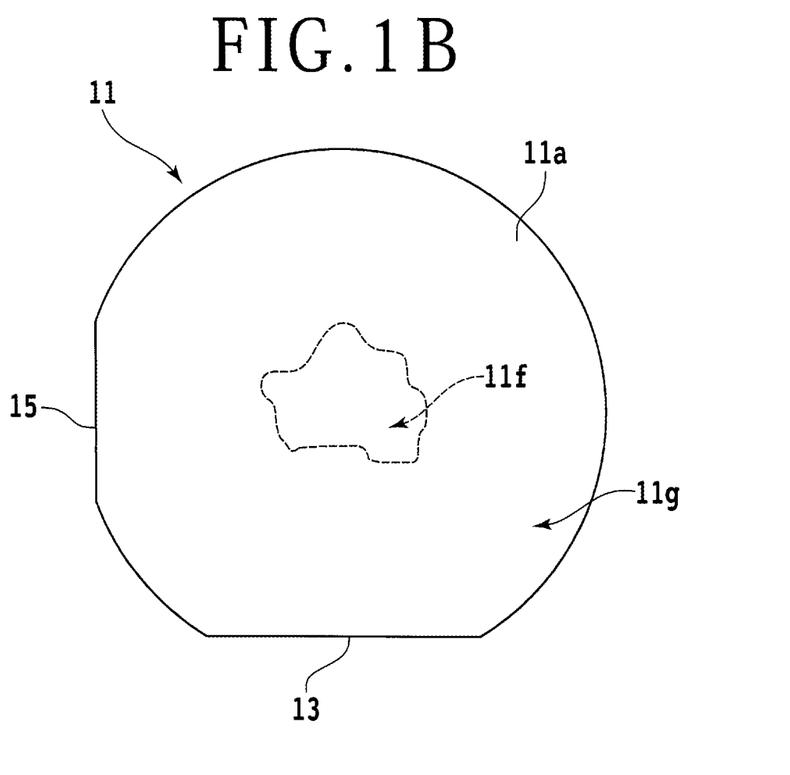
FIG. 1B is a top plan view schematically illustrating the ingot of FIG. 1A.

The ingot 11 illustrated in FIGS. 1A and 1B is formed, for example, from a cylindrical SiC single crystal having an upper surface (front surface) 11a and a lower surface (back surface) 11b, which are substantially parallel to each other. The ingot 11 is formed using epitaxial growth so that a c-axis 11c of the SiC single crystal is slightly tilted with respect to a normal 11d to the front surface 11a and back surface 11b.

An angle (off angle) formed between the c-axis 11c and the normal 11d is, for example, 1° to 6° (typically, 4°). On a side wall of the ingot 11, two flat portions that indicate crystal orientations of the SiC single crystal, specifically a first orientation flat 13 and a second orientation flat 15 are formed.

The first orientation flat 13 is longer than the second orientation flat 15. Further, the second orientation flat 15 is formed such that it extends in parallel to a cross line where a plane parallel to a c-plane 11e of the SiC single crystal and the front surface 11a or back surface 11b cross.

The ingot 11 is doped with an impurity such as nitrogen to impart electrical conductivity. In the ingot 11, a facet region 11f and a non-facet region 11g are included. The facet region 11f is a region which is flat at the atomic level, whereas the non-facet region 11g is a region other than the facet region 11f.

The facet region 11f is higher in impurity concentration than the non-facet region 11g. In FIG. 1B, a boundary between the facet region 11f and the non-facet region 11g is indicated by a dashed line, although this boundary line is an imaginary line and does not exist in the actual ingot 11.

The material of the ingot 11 is not limited to SiC, and may be lithium tantalate (LT; $LiTaO_3$) or gallium nitride (GaN). One of or both the first orientation flat 13 and the second orientation flat 15 may not be disposed on the side wall of the ingot 11.

Figure 2:
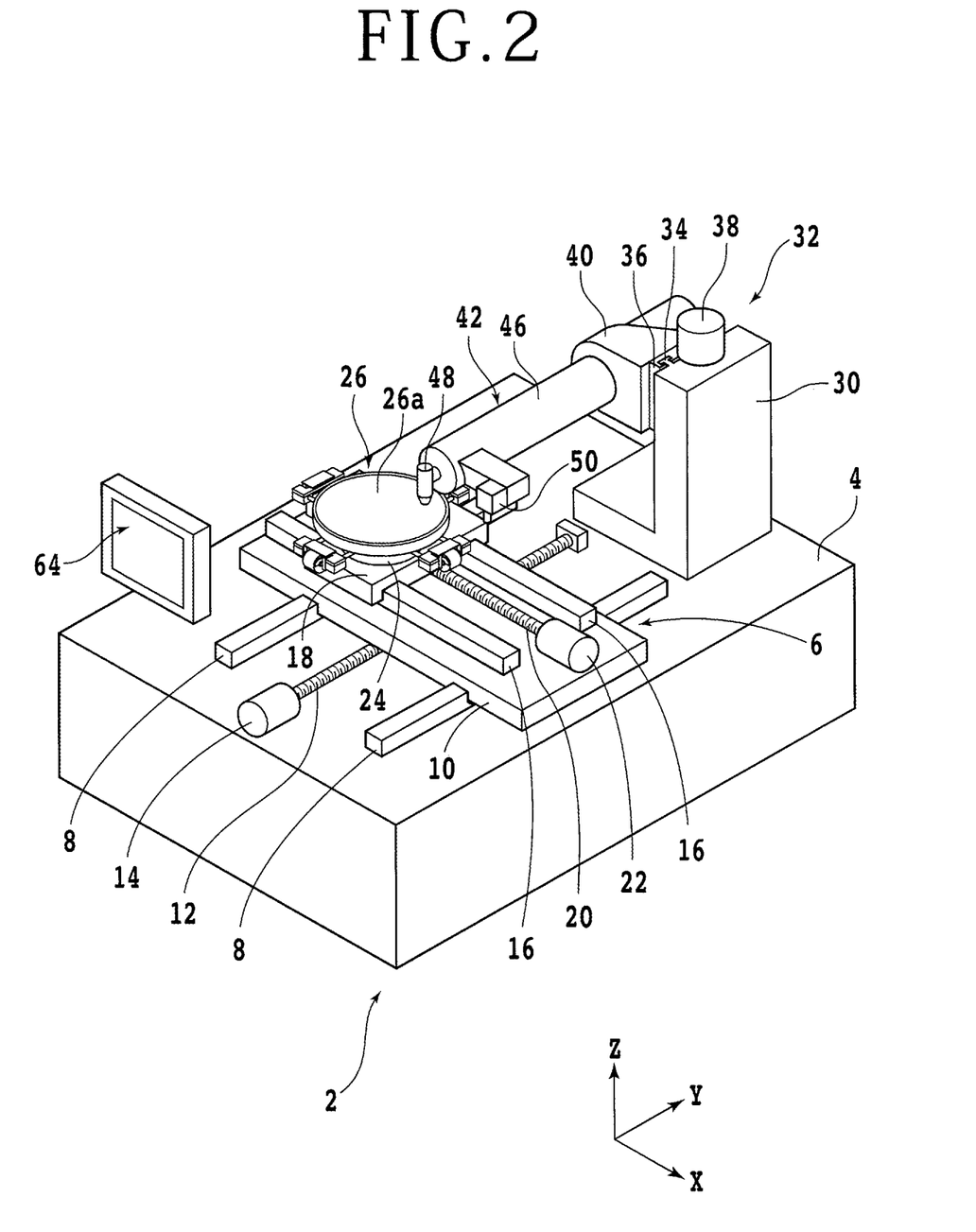
FIG. 2 is a perspective view schematically illustrating a laser processing apparatus according to an embodiment of a first aspect of the present invention.

FIG. 2 is a perspective view schematically illustrating a laser processing apparatus according to an embodiment of a first aspect of the present invention. An X-axis direction and a Y-axis direction indicated in FIG. 2 are directions orthogonal to each other on a horizontal plane, and a Z-axis direction also indicated in FIG. 2 is a direction (a vertical direction) orthogonal to the X-axis direction and Y-axis direction.

The laser processing apparatus 2 illustrated in FIG. 2 has a bed 4 that supports individual configuration elements. On an upper surface of the bed 4, a horizontal moving mechanism 6 is arranged. The horizontal moving mechanism 6 is fixed on the upper surface of the bed 4 and has a pair of Y-axis guide rails 8 extending along the Y-axis direction.

To upper parts of the paired Y-axis guide rails 8, a Y-axis moving plate 10 is connected in a manner that the Y-axis moving plate 10 is slidable along the paired Y-axis guide rails 8. Between the paired Y-axis guide rails 8, a screw shaft 12 is arranged extending along the Y-axis direction. To an end portion of the screw shaft 12, a motor 14 is connected to rotate the screw shaft 12.

On a surface of the screw shaft 12 in which a helical groove is formed, there is disposed a nut portion (not illustrated) that accommodates balls rolling in the surface of the rotating screw shaft 12, thereby a ball screw is constructed. When the screw shaft 12 rotates, the balls therefore circulate through the nut portion so that the nut portion moves along the Y-axis direction.

This nut portion is fixed on a side of a lower surface of the Y-axis moving plate 10. The Y-axis moving plate 10 therefore moves together with the nut portion in the Y-axis direction when the screw shaft 12 is rotated by the motor 14.

On an upper surface of the Y-axis moving plate 10, a pair of X-axis guide rails 16 is fixed extending along the X-axis direction. To upper parts of the paired X-axis guide rails 16, an X-axis moving plate 18 is connected in a manner that the X-axis moving plate 18 is slidable along the paired X-axis guide rails 16.

Between the paired X-axis guide rails 16, a screw shaft 20 is arranged extending along the X-axis direction. To an end portion of the screw shaft 20, a motor 22 is connected to rotate the screw shaft 20.

On a surface of the screw shaft 20 in which a helical groove is formed, there is disposed a nut portion (not illustrated) that accommodates balls rolling in the surface of the rotating screw shaft 20, thereby a ball screw is constructed. When the screw shaft 20 rotates, the balls therefore circulate through the nut portion so that the nut portion moves along the X-axis direction.

This nut portion is fixed on a side of a lower surface of the X-axis moving plate 18. The X-axis moving plate 18 therefore moves together with the nut portion in the X-axis direction when the screw shaft 20 is rotated by the motor 22.

On a side of an upper surface of the X-axis moving plate 18, a cylindrical table base 24 is arranged. On an upper part of the table base 24, a chuck table (holding unit) 26 is arranged to hold the ingot 11.

To a lower part of the table base 24, a rotary drive source (not illustrated) such as a motor is connected. By a force generated from the rotary drive source, the chuck table 26 is rotated about an axis of rotation, which is substantially parallel to the Z-axis direction.

The table base 24 and the chuck table 26 are moved in the X-axis direction and Y-axis direction by the above-mentioned horizontal moving mechanism 6. A portion of an upper surface of the chuck table 26 is formed, for example, with a porous material and functions as a holding surface 26a that holds the ingot 11.

The holding surface 26a is substantially parallel to the X-axis direction and the Y-axis direction. The holding surface 26a is connected to a suction source (not illustrated) such as a vacuum pump via a flow passage (not illustrated) disposed inside the chuck table 26. When this suction source is operated, a negative pressure occurs at the holding surface 26a. As a consequence, the ingot 11 mounted on the side of the back surface 11b thereof on the holding surface 26a is held under suction.

On a region of the bed 4, the region being on one side in the Y-axis direction, a support structure 30 having side walls substantially parallel to the Y-axis direction is disposed. On one of the side walls of the support structure 30, specifically the side wall on a rear side in the X-axis direction, a vertical moving mechanism 32 is arranged. The vertical moving mechanism 32 is fixed on the rear side wall of the support structure 30, and has a pair of Z-axis guide rails 34 extending along the Z-axis direction.

On side portions of the paired Z-axis guide rails 34, the side portions being on a side away from the support structure 30, a Z-axis moving plate 36 is connected in a manner that the Z-axis moving plate 36 is slidable along the paired Z-axis guide rails 34. Between the paired Z-axis guide rails 34, a screw shaft (not illustrated) is arranged extending along the Z-axis direction. To an end portion of this screw shaft, a motor 38 is connected to rotate the screw shaft.

On a surface of this screw shaft in which a helical groove is formed, there is disposed a nut portion (not illustrated) that accommodates balls rolling in the surface of the rotating screw shaft, thereby a ball screw is constructed. When the screw shaft rotates, the balls therefore circulate through the nut portion so that the nut portion moves along the Z-axis direction.

This nut portion is fixed on one of side walls of the Z-axis moving plate 36, the one side wall being on a side closer to the support structure 30. The Z-axis moving plate 36 therefore moves together with the nut portion along the Z-axis direction when the screw shaft is rotated by the motor 38.

Figure 3:
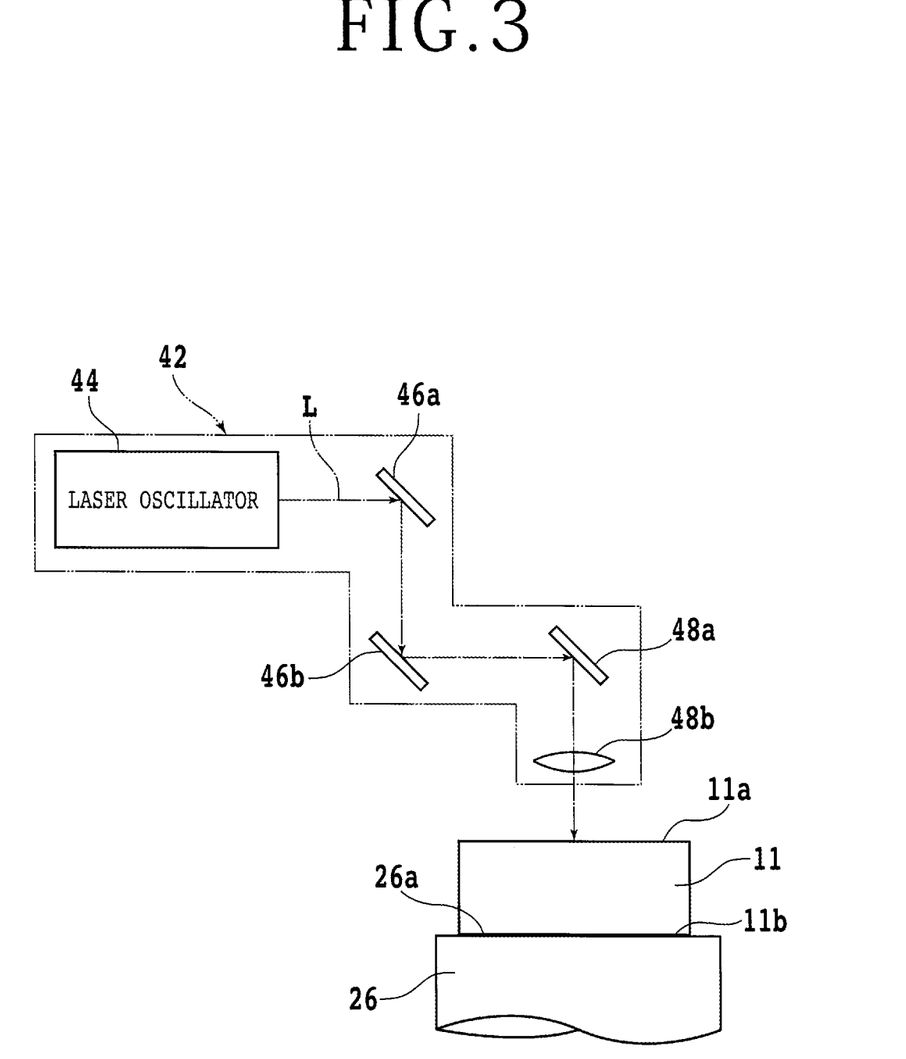
FIG. 3 is a diagram illustrating how a laser beam advances inside the laser processing apparatus.

On the other side wall of the Z-axis moving plate 36, the other side wall being on a side away from the support structure 30, a support casing 40 is fixed. The support casing 40 supports a laser beam irradiation unit 42 at a portion thereof. FIG. 3 is a diagram illustrating how a laser beam L advances inside the laser processing apparatus 2. It is to be understood that, in FIG. 3, one of configuration elements of the laser beam irradiation unit 42 is illustrated by a functional block.

As illustrated in FIGS. 2 and 3, the laser beam irradiation unit 42 includes, for example, a laser oscillator 44 fixed on the bed 4, a cylindrical housing 46 supported at an end portion thereof, which is on a side of one end in the Y-axis direction, on the support casing 40 and extending in the Y-axis direction, and an irradiation head 48 disposed on an opposite end portion of the housing 46 (an end portion on the other side in the Y-axis direction).

The laser oscillator 44 has, for example, a laser medium such as neodymium: yttrium-aluminum-garnet (Nd:YAG) suited for laser oscillation, generates the laser beam L of a wavelength (for example, 1,064 nm) having transmissivity through the ingot 11, and emits the laser beam L toward the housing 46. It is to be understood that the type of the laser oscillation performed at the laser oscillator 44 may be either continuous-wave (CW) oscillation or pulsed oscillation.

The housing 46 accommodates some configuration elements of an optical system that makes up the laser beam irradiation unit 42, for example, mirrors 46a and 46b illustrated in FIG. 3, and guides the laser beam L, which has been emitted from the laser oscillator 44, to the irradiation head 48.

In the irradiation head 48, some other configuration elements of the optical system that makes up the laser beam irradiation unit 42, for example, a mirror 48a and a condenser lens 48b are accommodated. The laser beam L which has been guided from the housing 46 is deflected downward in its advancing path by the mirror 48a, and is then condensed by the condenser lens 48b to a predetermined height on a side of the chuck table 26.

Figure 4:
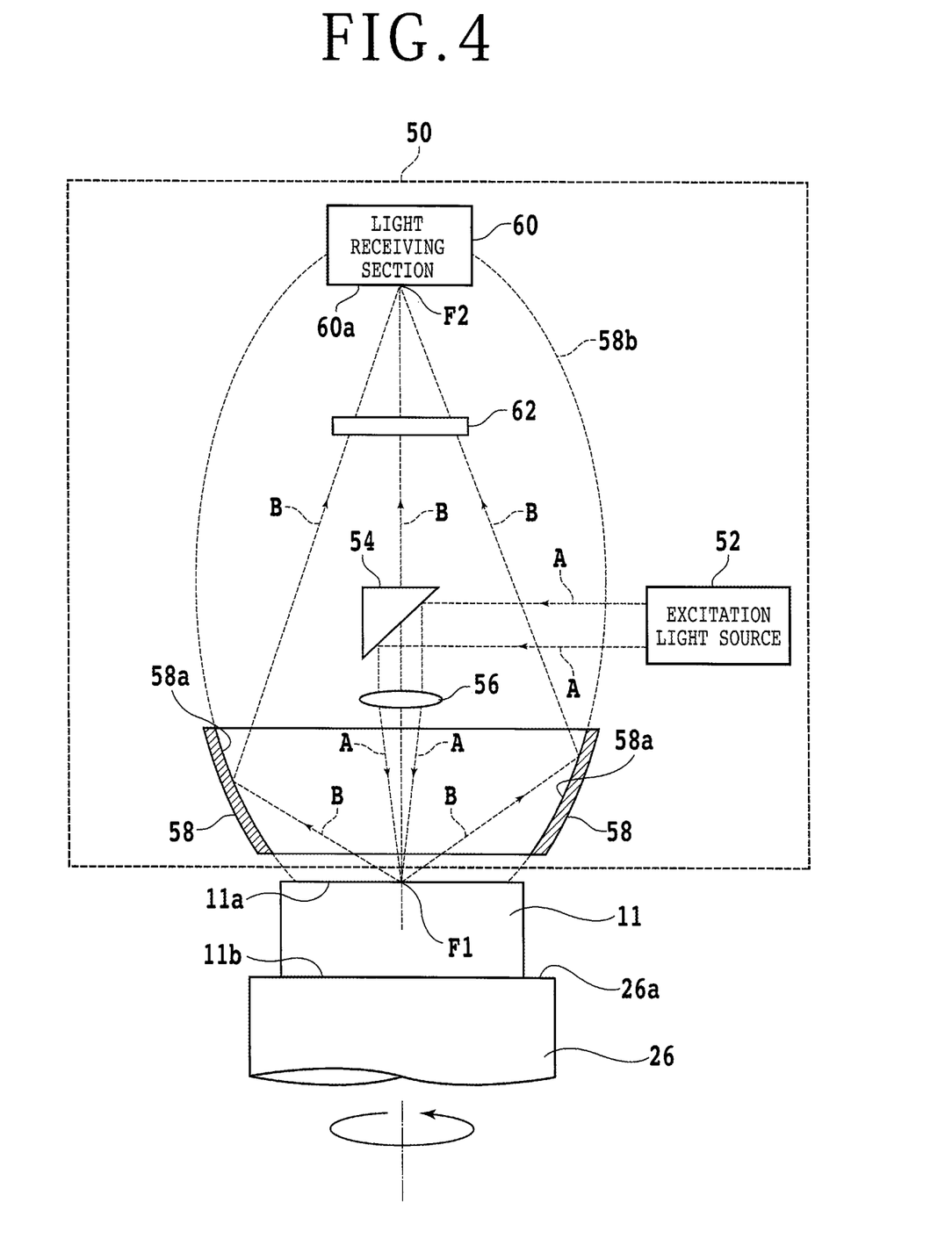
FIG. 4 is a diagram schematically illustrating an example of a fluorescence detection unit in the laser processing apparatus.

As illustrated in FIG. 2, a fluorescence detection unit 50 is arranged at a position adjacent the irradiation head 48 in the X-axis direction. FIG. 4 is a diagram schematically illustrating an example of the fluorescence detection unit 50.

It is to be understood that, in FIG. 4, some of configuration elements of the fluorescence detection unit 50 are illustrated by functional blocks.

The fluorescence detection unit 50 has an excitation light source 52. The excitation light source 52 has, for example, a GaN-based light-emitting device, and irradiates excitation light A of a wave length (for example, 365 nm), which is absorbed by the ingot 11, toward a mirror 54 arranged laterally of the excitation light source 52. Then, the excitation light A is reflected by the mirror 54, and is condensed by a condenser lens 56 arranged below the mirror 54.

The fluorescence detection unit 50 also has a ring-shaped ellipsoid mirror 58 having a reflection surface 58a on an inner side thereof. It is to be understood that, in FIG. 4, the ellipsoid mirror 58 is illustrated in cross-section. The reflection surface 58a corresponds to a part of a curved surface of a spheroid formed by rotating an ellipse 58b, which has a major axis extending in the vertical direction and a minor axis extending in a horizontal direction, specifically in the X-axis direction, about the major axis.

The ellipsoid mirror 58 has two focal points F1 and F2, and condenses light, which has occurred from one (for example, the focal point F1) of the focal points, at the other one (for example, the focal point F2). The condenser lens 56 is designed such that its focal point substantially coincides with the focal point F1. Therefore, the excitation light A is condensed at the focal point F1.

The fluorescence detection unit 50 also has a light receiving section 60. The light receiving section 60 has a photomultiplier tube or the like, which, upon reception of light having, for example, a wavelength of 900 nm or shorter, outputs an electrical signal indicating the number of photons of the light. As an alternative, the light receiving section 60 may have a photomultiplier tube or the like, which, upon reception of light having a wavelength of 1,200 nm or 1,500 nm or shorter, outputs an electrical signal indicating the number of photons of the light. The light receiving section 60 is disposed such that its light receiving surface 60a coincides at a center thereof with the focal point F2 of the ellipsoid mirror 58.

In the fluorescence detection unit 50, the light which occurs at the focal point F1 and then is reflected by the ellipsoid mirror 58 passes a filter 62 and advances toward the focal point F2. In other words, the filter 62 is disposed on an optical path between the focal point F1 and the focal point F2 of the ellipsoid mirror 58. The filter 62 has an infrared radiation (IR) filter that, for example, allows light in a wavelength of 750 nm or longer to pass and cuts off light in a wavelength range of shorter than 750 nm.

The fluorescence detection unit 50 is fixed on the housing 46 of the laser beam irradiation unit 42. When the vertical moving mechanism 32 is operated, the housing 46 and irradiation head 48 of the laser beam irradiation unit 42 and the fluorescence detection unit 50 are moved in the Z-axis direction accordingly.

The bed 4 is covered at an upper section thereof by a cover (not illustrated) to accommodate the individual configuration elements therein. On a wall of the cover, a touch panel 64 is arranged as illustrated in FIG. 2. The touch panel 64 is configured by an input device such as a capacitive touch sensor or a resistive film touch sensor, and a display device such as a liquid crystal display or an organic electroluminescence (EL) display.

Figure 5:
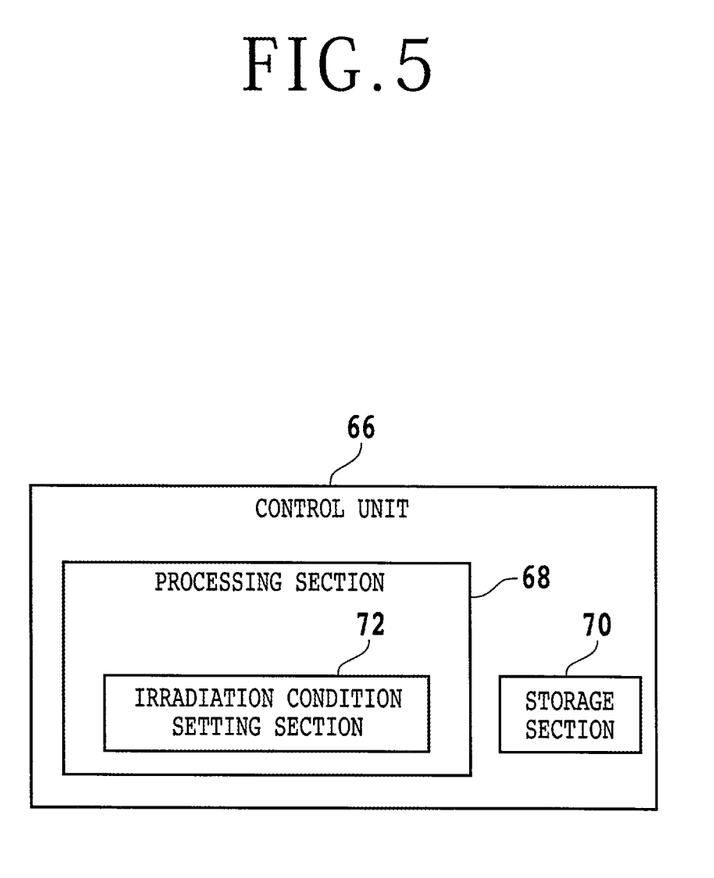
FIG. 5 is a functional block diagram schematically illustrating an example of a control unit in the laser processing apparatus.

Operations of the respective configuration elements of the above-mentioned laser processing apparatus 2 are controlled by a control unit built in the laser processing apparatus 2. FIG. 5 is a functional block diagram schematically illustrating an example of such a control unit. The control unit 66 illustrated in FIG. 5 has, for example, a processing section 68 that generates a variety of signals to operate the individual configuration elements, and a storage section 70 that stores a variety of information (data, programs, etc.) to be used at the processing section 68.

Functions of the processing section 68 are realized by a central processing unit (CPU) or the like, which reads one or more of the programs stored in the storage section 70 and executes them. On the other hand, functions of the storage section 70 are realized by at least one of semiconductor memories such as a dynamic random access memory (DRAM), a static random access memory (SRAM), and a NAND type flash memory, and a magnetic storage device such as a hard disk drive (HDD).

The processing section 68 has an irradiation condition setting section 72 to set irradiation conditions for the laser beam L to be irradiated from the laser beam irradiation unit 42 to the ingot 11 held on the side of the back surface 11b thereof under suction on the holding surface 26a of the chuck table 26. For example, in a state where the focal point F1 coincides with one of a plurality of coordinate points, which indicates one of a plurality of regions included on the front surface 11a of the ingot 11, on a coordinate plane parallel to the holding surface 26a, the irradiation condition setting section 72 operates the excitation light source 52 so that the excitation light A is irradiated.

At this time, the light receiving section 60 of the fluorescence detection unit 50 receives fluorescence B occurring at the focal point F1, and generates an electrical signal indicating the number of its photons. The irradiation condition setting section 72 then causes the storage section 70 to store the coordinate point, which coincides with the focal point F1, and the number of the photons of the fluorescence B as detected by the fluorescence detection unit 50 when the excitation light A is irradiated to the region, which is indicated by the coordinate point, on the front surface 11a of the ingot 11, in association with each other.

Similarly, in a state where the focal point F1 sequentially coincides with each of the remaining coordinate points, the irradiation condition setting section 72 operates the excitation light source 52 so that the excitation light A is irradiated. As a result, electrical signals which indicate the numbers of photons of the fluorescence B are generated as many as the number of the remaining coordinate points. The irradiation condition setting section 72 then causes the storage section 70 to store respective ones of the remaining coordinate points and the numbers of photons of the fluorescence B, which are detected by the fluorescence detection unit 50 when the excitation light A is sequentially irradiated to the respective remaining ones of the regions on the front surface 11a of the ingot 11 as indicated by the coordinate points, in association with each other.

Figure 6:
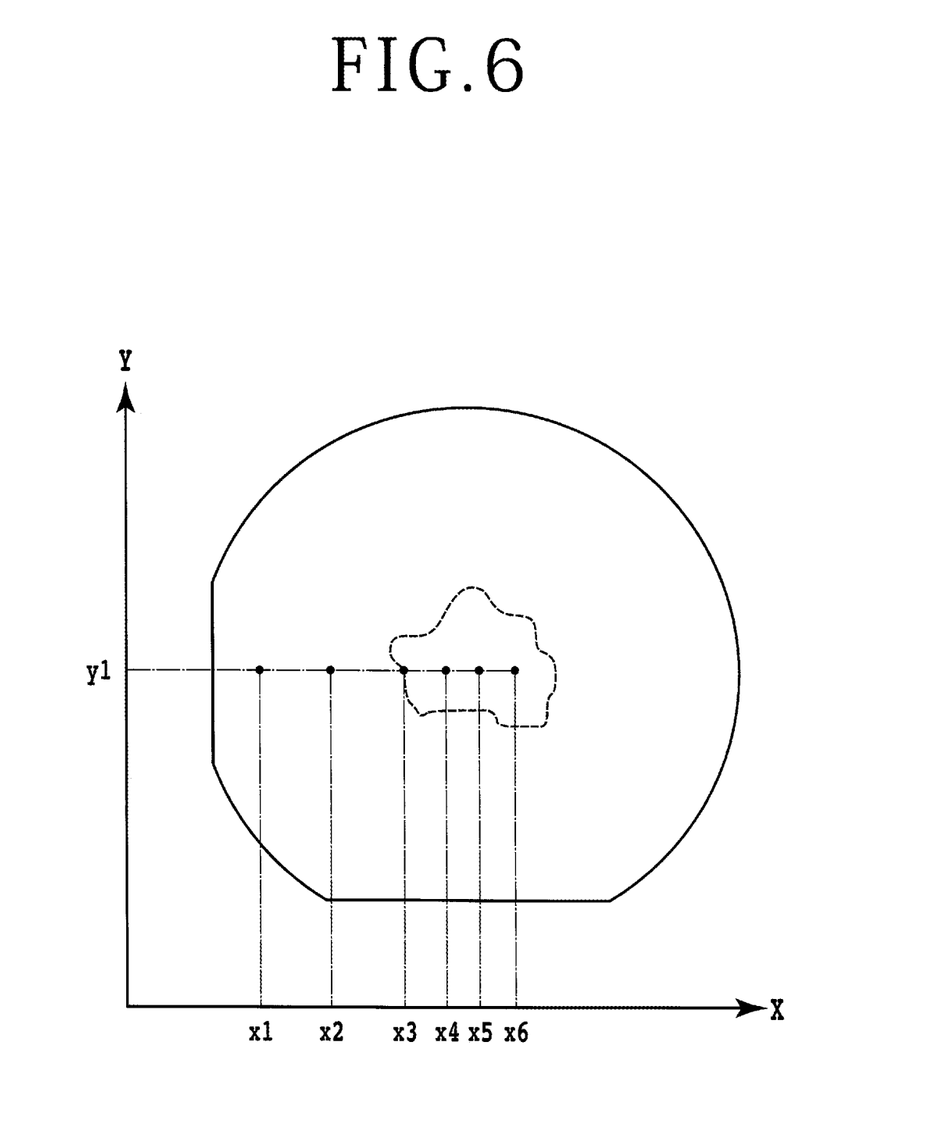
FIG. 6 is a diagram schematically illustrating an example of a plurality of coordinate points stored in a storage section in the laser processing apparatus.

FIG. 6 is a diagram schematically illustrating an example of the plurality of coordinate points stored in the storage section 70. Table 1 schematically illustrates examples of the numbers (count per second: cps) of photons of the fluorescence B detected by the fluorescence detection unit 50 when the excitation light A was sequentially irradiated to respective ones of regions on the front surface 11a of the ingot 11 as indicated by the coordinate points.

TABLE 1

| Coordinate point | Number of photons (cps) |
| --- | --- |
| x1, y1 | 5000 |
| x2, y1 | 5000 |

TABLE 1-continued

| Coordinate point | Number of photons (cps) |
| --- | --- |
| x3, y1 | 4000 |
| x4, y1 | 2500 |
| x5, y1 | 1000 |
| x6, y1 | 3000 |

For example, the six coordinate points (x1,y1), (x2,y1), (x3,y1), (x4,y1), (x5,y1), and (x6,y1) and the six numbers of photons (5000 cps), (5000 cps), (4000 cps), (2500 cps), (1000 cps), and (3000 cps) are hence stored in combination with each other in the storage section 70.

Further, stored beforehand in the storage section 70 are irradiation conditions for a laser beam to be set for the respective regions, which are indicated by the coordinate points, on the front surface 11a of the ingot 11 according to the numbers of photons of the fluorescence B detected by the fluorescence detection unit 50. The irradiation condition setting section 72 sets irradiation conditions for the laser beam L to the respective regions, which are indicated by the coordinate points, on the front surface 11a of the ingot 11 with reference to the irradiation conditions for the laser beam L, which correspond to the numbers of the photons of the fluorescence B, from the storage section 70.

Here, a description will be made about the irradiation conditions for the laser beam L to be set for the respective regions, which are indicated by the coordinate points, on the front surface 11a of the ingot 11 according to the numbers of the photons of the fluorescence B as stored in the storage section 70. First, the number of photons of fluorescence B to be generated by irradiation of the excitation light A to the ingot 11 decreases as the concentration of the impurity (nitrogen or the like) doped in the ingot 11 becomes higher. In addition, the ingot 11 is higher in refractive index and also higher in energy absorption rate in a region having a higher impurity concentration.

If the laser beam L of the wavelength having transmissivity through the ingot 11 is irradiated to the ingot 11, in which regions of different impurity concentrations exist, from the side of the front surface 11a under the same irradiation conditions, a separation layer is formed at a deeper position from the front surface 11a in a region of a higher impurity concentration. In other words, the focal point of the laser beam L becomes deeper from the front surface 11a in a region of a higher impurity concentration.

In order to form a separation layer at a uniform depth from the front surface 11a in the ingot 11 in which regions of different impurity concentrations exist, it is therefore necessary to set the irradiation conditions for the laser beam L according to the impurity concentrations.

The irradiation conditions set for the laser beam L as described above include the output power of the laser beam L, the height of the condenser lens 48b that condenses the laser beam L, and so on. If the laser beam L is a pulsed laser beam (if the laser oscillator 44 performs pulsed oscillation), the overlap rate of the laser beam L may also be included in the irradiation conditions for the laser beam L.

Figure 7A:
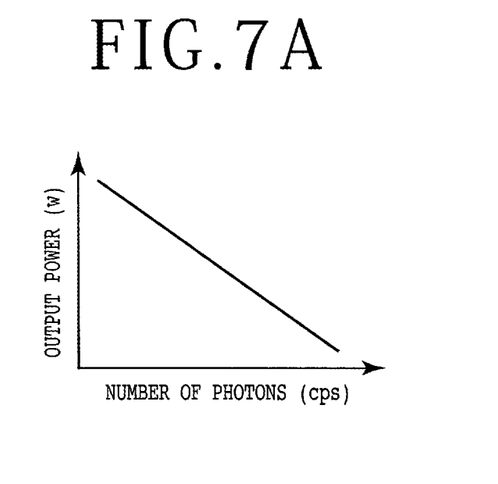
FIG. 7A is a graph schematically illustrating a linear correlation between the numbers of photons of fluorescence and output powers of a laser beam, which are stored in the storage section.
Figure 7B:
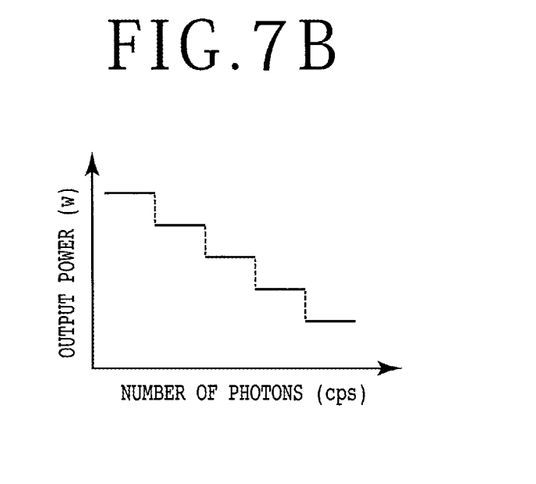
FIG. 7B is a graph schematically illustrating a stepwise correlation between the numbers of photons of fluorescence and output powers of a laser beam, which are stored in the storage section.

For example, the irradiation condition setting section 72 sets the irradiation conditions for the laser beam L so that the output power of the laser beam L becomes lower linearly (see FIG. 7A) or stepwise (see FIG. 7B) as the number of photons of the fluorescence B increases. FIGS. 7A and 7B are graphs schematically illustrating a linear correlation and a stepwise correlation, respectively, between the numbers of photons of the fluorescence B and output powers of the laser beam L, which are stored in the storage section 70. Under such irradiation conditions for the laser beam L, it is possible to reduce variations in the depth of a separation layer, which is to be formed in the ingot 11 with regions of different impurity concentrations existing therein, from the front surface 11a.

Figure 7C:
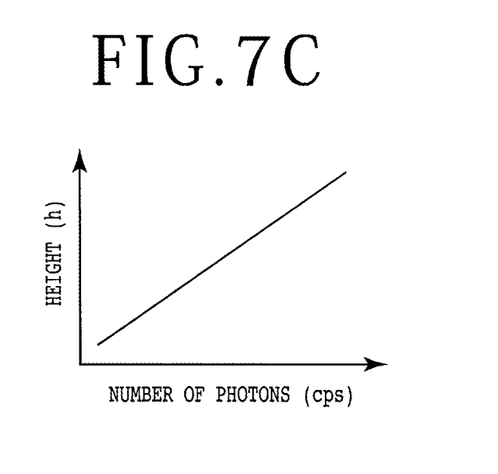
FIG. 7C is a graph schematically illustrating a linear correlation between the numbers of photons of fluorescence and heights of a condenser lens, which are stored in the storage section.
Figure 7D:
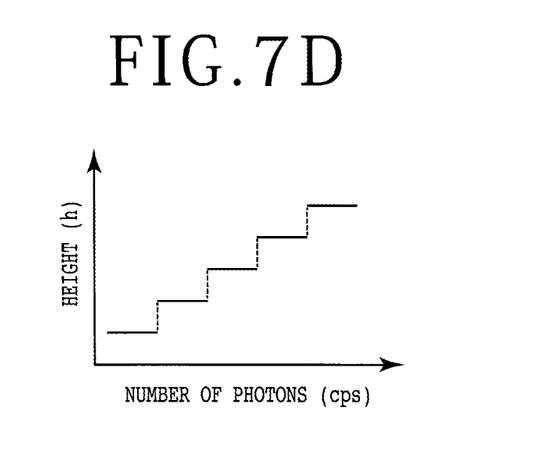
FIG. 7D is a graph schematically illustrating a stepwise correlation between the numbers of photons of fluorescence and heights of the condenser lens, which are stored in the storage section.

The irradiation condition setting section 72 may also set the irradiation conditions for the laser beam L so that the position (height) of the condenser lens 48b, which condenses the laser beam L, becomes higher linearly (see FIG. 7C) or stepwise (see FIG. 7D) as the number of photons of the fluorescence B detected by the fluorescence detection unit 50 increases. FIGS. 7C and 7D are graphs schematically illustrating a linear correlation and a stepwise correlation, respectively, between the numbers of photons of the fluorescence B and heights of the condenser lens 48b, which are stored in the storage section 70. Under such irradiation conditions for the laser beam L, it is possible to reduce variations in the depth of a separation layer, which is to be formed in the ingot 11 with regions of different impurity concentrations existing therein, from the front surface 11a.

Figure 7E:
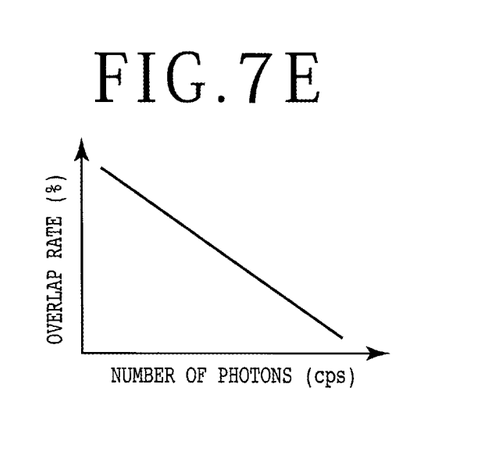
FIG. 7E is a graph schematically illustrating a linear correlation between the numbers of photons of fluorescence and overlap rates of the laser beam, which are stored in the storage section.
Figure 7F:
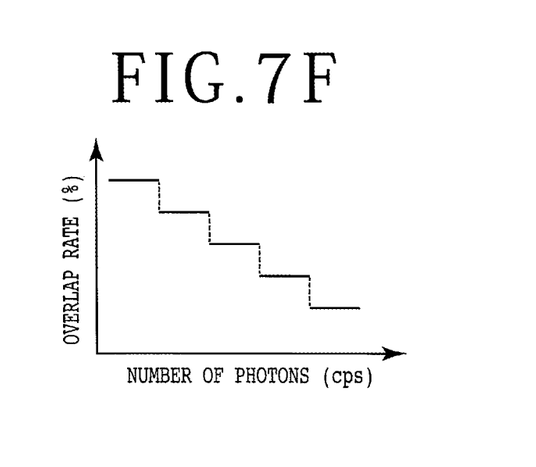
FIG. 7F is a graph schematically illustrating a stepwise correlation between the numbers of photons of fluorescence and overlap rates of the laser beam, which are stored in the storage section.

The irradiation condition setting section 72 may also set the irradiation conditions for the laser beam L such that the overlap rate of the laser beam L, which is a pulsed laser beam, becomes lower linearly (see FIG. 7E) or stepwise (see FIG. 7F) as the number of photons of the fluorescence B detected by the fluorescence detection unit 50 increases. FIGS. 7E and 7F are graphs schematically illustrating a linear correlation and a stepwise correlation, respectively, between the numbers of photons of the fluorescence B and overlap rates of the laser beam L, which are stored in the storage section 70. Under such irradiation conditions for the laser beam L, it is possible to reduce variations in the depth of a separation layer, which is to be formed in the ingot 11 with regions of different impurity concentrations existing therein, from the front surface 11a.

In the laser processing apparatus 2, the irradiation conditions for the laser beam L to the respective regions can be sequentially set according to the numbers of the photons of the fluorescence B occurring when the excitation light A is irradiated to the respective regions included in the upper surface (front surface) 11a of the ingot 11. As mentioned above, the number of photons of such fluorescence depends on the concentration of an impurity doped in an ingot.

In the laser processing apparatus 2, the separation layer can therefore be formed at a uniform depth from the upper surface (front surface) 11a of the ingot 11 even if regions of different impurity concentrations are included in the ingot 11. It is hence possible to reduce the kerf loss when wafers are sliced from the ingot 11.

Figure 8:
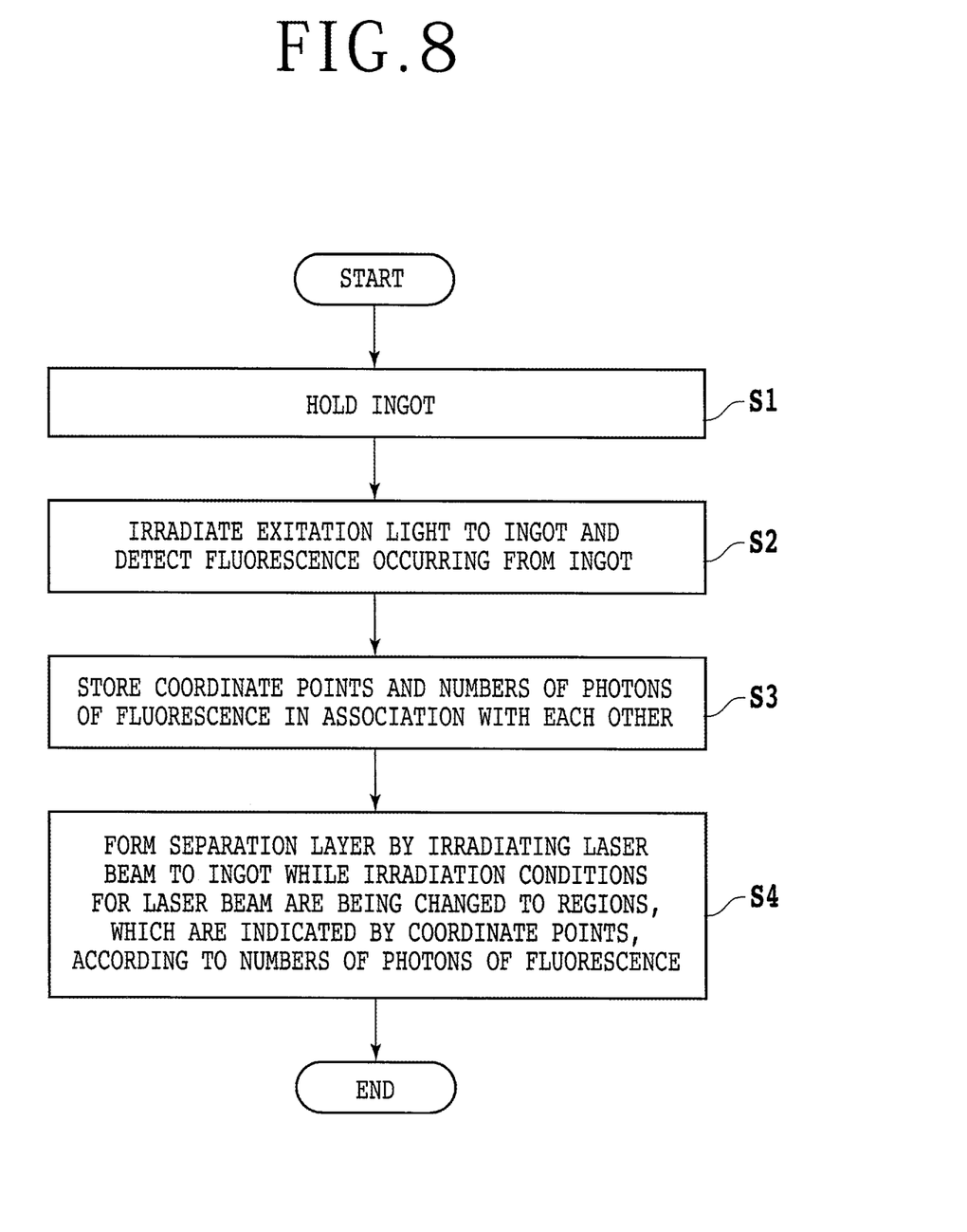
FIG. 8 is a flow chart schematically illustrating a laser processing method according to an embodiment of a second aspect of the present invention.

FIG. 8 is a flow chart schematically illustrating a laser processing method according to an embodiment of a second aspect of the present invention for forming a separation layer in the ingot 11 to slice a wafer. In this method, the ingot 11 is first held (holding step: S1).

For example, the ingot 11 is mounted on the holding surface 26a of the chuck table 26 so that the front surface 11a of the ingot 11 is directed upward. The suction source connected to the holding surface 26a is then operated. As a consequence, the ingot 11 mounted on the side of the back surface 11b thereof on the holding surface 26a is held under suction.

Figure 9:
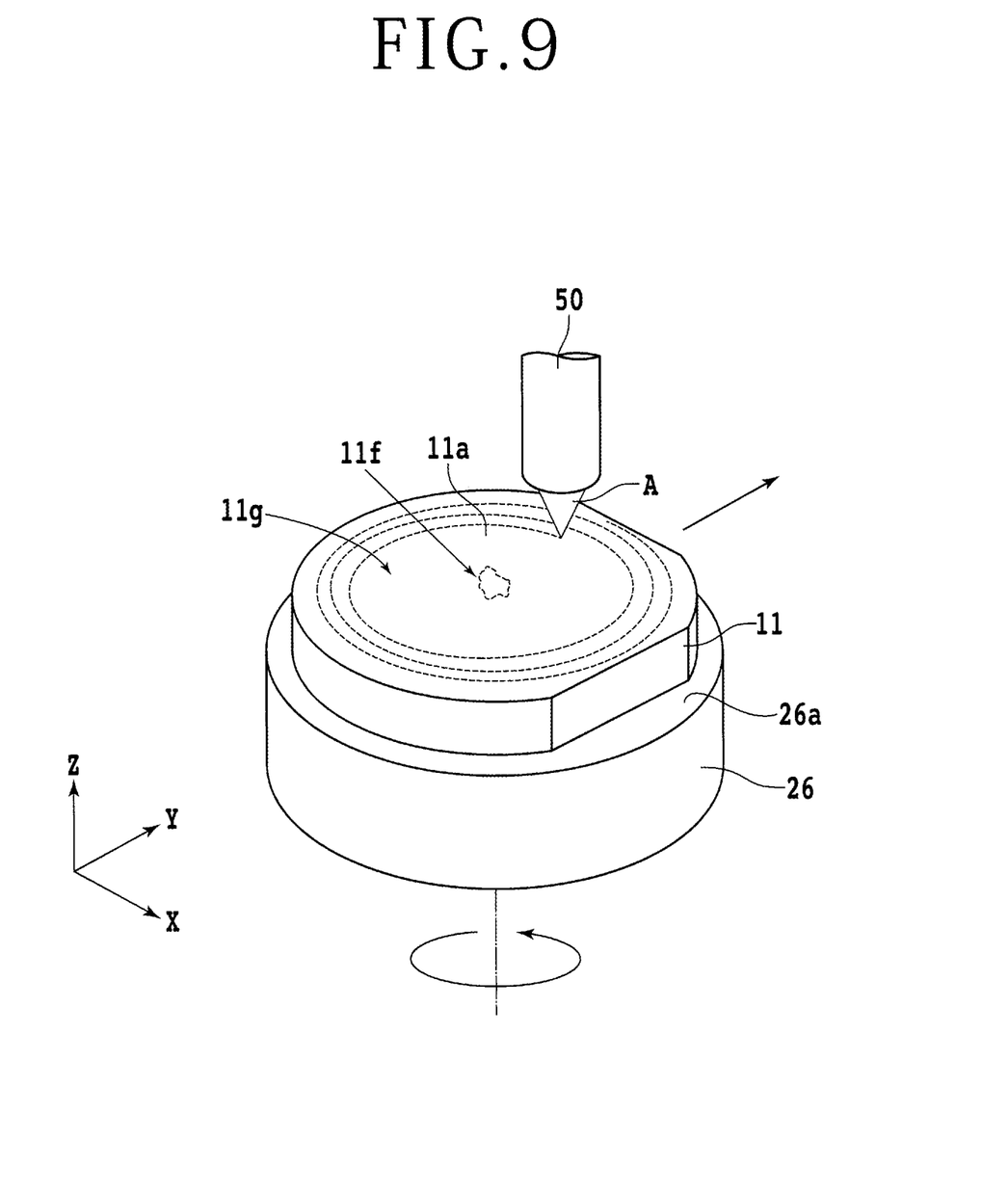
FIG. 9 is a perspective view schematically illustrating a fluorescence detection step in the laser processing method.

The excitation light A of a predetermined wavelength (for example, 365 nm) is then irradiated to the ingot 11 from above the ingot 11, and the fluorescence B occurring from the ingot 11 is detected (fluorescent detection step: S2). FIG. 9 is a perspective view schematically illustrating the fluorescence detection step (S2).

In the fluorescence detection step (S2), the excitation light A is irradiated to the ingot 11 with the focal point F1 of the ellipsoid mirror 58 of the fluorescence detection unit 50, that is, the height of the focal point of the excitation light A coincided with the front surface 11a of the ingot 11. At this time, the focal point of the excitation light A and the ingot 11 are relatively moved in the horizontal direction so that the excitation light A is sequentially irradiated to the regions, which are indicated by respective ones of a plurality of coordinate points (hereinafter simply called "the respective coordinate points" for the sake of simplicity) on the coordinate plane parallel to the holding surface 26a, on the front surface 11a of the ingot 11.

For example, the excitation light A is first irradiated to the region indicated by one of the coordinate points, the one coordinate point being located in a vicinity of an outer periphery of the front surface 11a of the ingot 11. While the excitation light A is being irradiated to the ingot 11, the rotary drive source is operated to rotate the chuck table 26, and the motor 14 connected to the screw shaft 12, which extends along the Y-axis, is also operated so that a center of the holding surface 26a gradually comes nearer to the focal point of the excitation light A.

As a consequence, the excitation light A is irradiated to the ingot 11 from the fluorescence detection unit 50 along a vertical trajectory indicated by a dashed line in FIG. 9. The fluorescence B occurring from the respective regions included in the front surface 11a of the ingot 11 is then detected by the light receiving section 60 of the fluorescence detection unit 50. It is to be understood that the irradiation of the excitation light A may also be performed while the rotary drive source is being operated to rotate the chuck table 26 and the motor 22 connected to the screw shaft 20 extending along the X-axis direction is being operated.

The coordinate points and the numbers of the photons of the fluorescence B are next stored in association with each other (storage step: S3). Specifically, the storage section 70 of the control unit 66 stores the respective coordinate points which indicate the regions included in the front surface 11a of the ingot 11, and the numbers of the photons of the fluorescence B as detected when the excitation light A is irradiated to the respective regions in the fluorescence detection step (S2), in association with each other.

Figure 10:
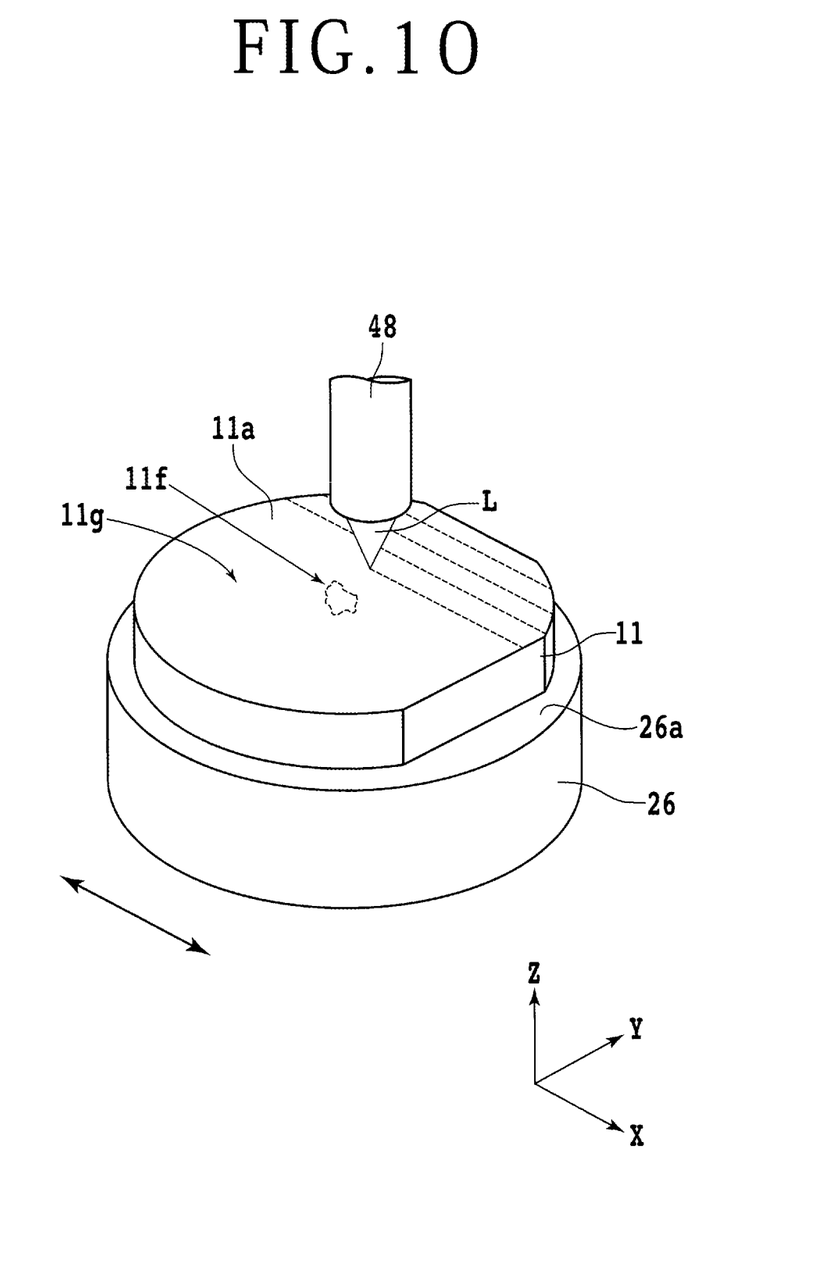
FIG. 10 is a perspective view schematically illustrating a laser beam irradiation step in the laser processing method.

While the irradiation conditions for the laser beam L are being changed to the respective regions on the front surface 11a of the ingot 11, which are indicated by the coordinate points according to the numbers of the photons of the fluorescence B, the laser beam L is then irradiated to the ingot 11 to form a separation layer (laser beam irradiation step: S4). FIG. 10 is a perspective view schematically illustrating the laser beam irradiation step (S4).

In the laser beam irradiation step (S4), the laser beam L of the wavelength (for example, 1,064 nm) having transmissivity through the ingot 11 is irradiated with the focal point of the laser beam L positioned at a depth corresponding to the thickness of a wafer to be sliced from a side of the front surface 11a of the ingot 11.

For example, the laser beam L is first irradiated to an end in the X-axis direction of the front surface 11a of the ingot 11. While the laser beam L is being irradiated to the ingot 11, the motor 22 included in the horizontal moving mechanism 6 is then operated to move the chuck table 26 along the X-axis direction until the focal point of the laser beam L reaches an opposite end in the X-axis direction of the front surface 11a of the ingot 11.

After the motor 14 included in the horizontal moving mechanism 6 is further operated such that the chuck table 26 is moved along the Y-axis direction, similar operations are repeated. As a consequence, the laser beam L is sequentially irradiated to the ingot 11 from the irradiation head 48 along a plurality of linear trajectories indicated by dashed lines in FIG. 10. As a result, a separation layer is formed in the ingot 11.

Here, the irradiation of the laser beam L is performed such that the laser beam L moves through the regions on the front surface 11a of the ingot 11 as indicated by the coordinate points stored in the storage section 70 in the fluorescence detection step (S2). In addition, the irradiation conditions for the laser beam L to the respective regions are set according to the numbers of the photons of the fluorescence B as stored in association with the respective coordinate points. The irradiation of the laser beam L is therefore performed with the irradiation conditions sequentially changed according to the numbers of the photons of the fluorescence B as stored in association with the respective coordinate points in the storage step (S3).

In the laser processing method illustrated in FIG. 8, the irradiation conditions for the laser beam L to the respective regions included in the upper surface (front surface) 11a of the ingot 11 are sequentially set according to the numbers of the photons of the fluorescence B occurring when the excitation light A is irradiated to the respective regions. As mentioned above, the number of photons of such fluorescence depends on the concentration of an impurity doped in an ingot.

In this method, a separation layer can therefore be formed at a uniform depth from the upper surface (front surface) 11a of the ingot 11 even if regions of different impurity concentrations are included in the ingot 11. It is hence possible to reduce the kerf loss when wafers are sliced from the ingot 11.

It is to be understood that the laser processing method illustrated in FIG. 8 is an embodiment of the first aspect of the present invention, and the laser processing method of the first aspect of the present invention should not be limited to the method illustrated in FIG. 8. For example, irradiation conditions for the laser beam L, which are set for the respective regions indicated by the coordinate points on the front surface 11a of the ingot 11 according to the numbers of photons of the fluorescence B, may be stored beforehand in the storage section 70 prior to the holding step (S1) in the laser processing method of the first aspect of the present invention (see FIG. 11).

Figure 11:
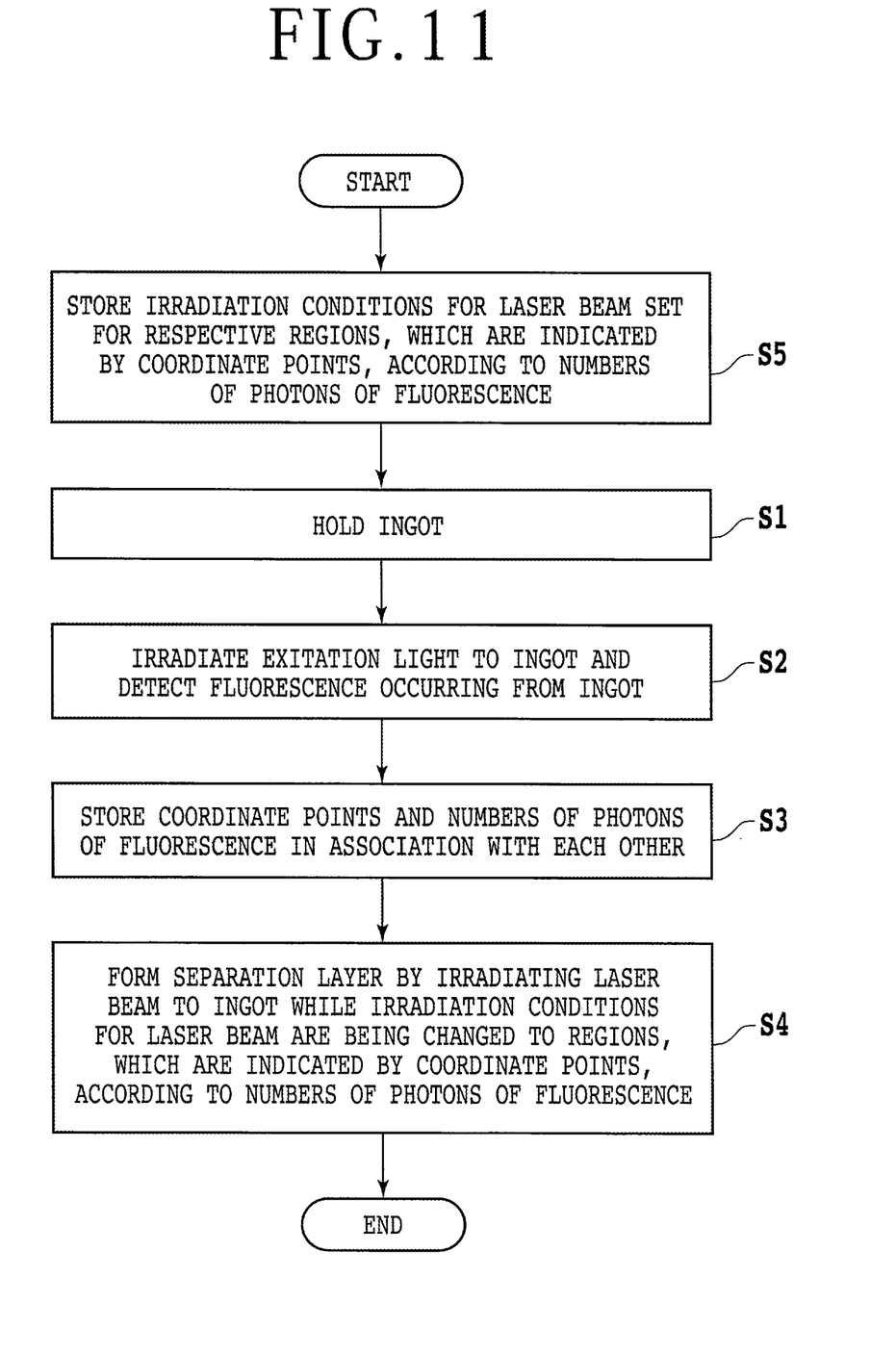
FIG. 11 is a flow chart schematically illustrating a laser processing method according to a modification of the laser processing method of FIG. 8.

In other words, the laser processing method of the first aspect of the present invention may further include an irradiation condition storage step (S5) that stores beforehand irradiation conditions for the laser beam L, which are to be set for respective ones of a plurality of regions indicated by a plurality of coordinate points on the front surface 11a of the ingot 11 according to the numbers of photons of the fluorescence B. In this case, the laser beam irradiation step (S4) sets irradiation conditions for the laser beam L to the respective regions, which are indicated by the coordinate points, on the front surface 11a of the ingot 11 with reference to the irradiation conditions for the laser beam L corresponding to the numbers of the photons of the fluorescence B as stored in the irradiation condition storage step (S5).

Moreover, the construction, method, and the like according to the above-mentioned embodiment can be practiced with changes or modifications as needed to such extent as not departing from the scope of the object of the present invention.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A laser processing apparatus for forming a separation layer in an ingot to slice a wafer, comprising:
    a holding unit having a holding surface to hold the ingot;
    a fluorescence detection unit configured to irradiate excitation light of a predetermined wavelength to the ingot from above the ingot and to detect fluorescence occurring from the ingot;
    a laser beam irradiation unit configured to irradiate a laser beam of a wavelength which has transmissivity through the ingot, to the ingot with a focal point of the laser beam positioned at a depth from an upper surface of the ingot, the depth corresponding to a thickness of the wafer to be sliced from the ingot, so that the separation layer is formed in the ingot;
    a horizontal moving mechanism that relatively moves the holding unit and the laser beam irradiation unit in a direction parallel to the holding surface; and
    a control unit, wherein
    the control unit has
        a storage section configured to store respective ones of a plurality of coordinate points which indicate a plurality of regions included on the upper surface of the ingot, on a coordinate plane parallel to the holding surface, and numbers of photons of fluorescence which are detected by the fluorescence detection unit when the excitation light is irradiated to respective ones of the plurality of regions, in association with each other, and
        an irradiation condition setting section configured to set irradiation conditions for the laser beam to the respective ones of the plurality of regions which are indicated by the plurality of coordinate points, according to the numbers of the photons of the fluorescence stored in association with the respective ones of the plurality of coordinate points.

2. The laser processing apparatus according to claim 1, wherein
    the storage section is configured to store beforehand irradiation conditions for the laser beam which are to be set for the respective ones of the plurality of regions indicated by the plurality of coordinate points, according to the numbers of the photons of the fluorescence detected by the fluorescence detection unit, and
    the irradiation condition setting section is configured to set irradiation conditions for the laser beam to the respective ones of the plurality of regions which are indicated by the plurality of coordinate points, with reference to the irradiation conditions for the laser beam which correspond to the numbers of the photons of the fluorescence and are stored in the storage section.

3. The laser processing apparatus according to claim 1, wherein
    the irradiation condition setting section is configured to set the irradiation conditions for the laser beam such that at least one of an output power of the laser beam, a height of a condenser lens that condenses the laser beam, and an overlap rate of the laser beam is changed according to the numbers of the photons of the fluorescence which are stored in association with the respective ones of the plurality of coordinate points.

4. The laser processing apparatus according to claim 2, wherein
the irradiation condition setting section is configured to set the irradiation conditions for the laser beam such that at least one of an output power of the laser beam, a height of a condenser lens that condenses the laser beam, and an overlap rate of the laser beam is changed according to the numbers of the photons of the fluorescence which are stored in association with the respective ones of the plurality of coordinate points.

5. A laser processing method for forming a separation layer in an ingot to slice a wafer, comprising:
a holding step of holding the ingot thereon;
a fluorescence detection step, after the holding step, of irradiating excitation light of a predetermined wavelength to the ingot from above the ingot and detecting fluorescence occurring from the ingot;
a storage step of storing respective ones of a plurality of coordinate points which indicate a plurality of regions included on an upper surface of the ingot, and numbers of photons of fluorescence which are detected when the excitation light of the predetermined wavelength is irradiated to the respective ones of the plurality of regions in the fluorescence detection step, in association with each other; and
a laser beam irradiation step of irradiating a laser beam of a wavelength which has transmissivity through the ingot, to the ingot with a focal point of the laser beam positioned at a depth from an upper surface of the ingot, the depth corresponding to a thickness of the wafer to be sliced from the ingot, and relatively moving the focal point and the ingot, so that the separation layer is formed in the ingot, wherein
in the laser beam irradiation step,
the separation layer is formed in the ingot while irradiation conditions for the laser beam are being changed to the respective ones of the plurality of regions which are indicated by the plurality of coordinate points, according to the numbers of the photons of the fluorescence stored in association with the respective ones of the plurality of coordinate points in the storage step.

6. The laser processing method according to claim 5, further comprising:
an irradiation condition storage step of storing beforehand irradiation conditions for the laser beam which are to be set for the respective ones of the plurality of regions indicated by the plurality of coordinate points, according to the numbers of the photons of the fluorescence occurring from the ingot by irradiating the excitation light of the predetermined wavelength to the ingot, wherein
in the laser beam irradiation step, the irradiation condition for the laser beam to the respective ones of the plurality of regions which are indicated by the plurality of coordinate points, are set with reference to the irradiation conditions for the laser beam which correspond to the numbers of the photons of the fluorescence as stored in the irradiation condition storage step.

7. The laser processing method according to claim 5, wherein, as the irradiation conditions for the laser beam, at least one of an output power of the laser beam, a height of a condenser lens that condenses the laser beam, and an overlap rate of the laser beam is set according to the numbers of the photons of the fluorescence which are stored in association with the respective ones of the plurality of coordinate points.

8. The laser processing method according to claim 6, wherein, as the irradiation conditions for the laser beam, at least one of an output power of the laser beam, a height of a condenser lens that condenses the laser beam, and an overlap rate of the laser beam is set according to the numbers of the photons of the fluorescence which are stored in association with the respective ones of the plurality of coordinate points.

* * * * *